US 6,696,233 B2

(12) United States Patent
Nomura et al.

(10) Patent No.: US 6,696,233 B2
(45) Date of Patent: Feb. 24, 2004

(54) SILVER HALIDE PHOTOGRAPHIC PHOTOSENSITIVE MATERIAL HAVING A POLYETHYLENE TEREPHTHALATE FILM BASE SUPPORT INTO WHICH ULTRAVIOLET LIGHT ABSORBER IS KNEADED

(75) Inventors: Tatsuya Nomura, Shizuoka-ken (JP); Takanori Sato, Shizuoka-ken (JP); Hideki Takaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/020,205

(22) Filed: Dec. 18, 2001

(65) Prior Publication Data
US 2002/0155397 A1 Oct. 24, 2002

(30) Foreign Application Priority Data
Feb. 14, 2001 (JP) ........................ 2001-036904

(51) Int. Cl.$^7$ ................... G03C 1/795; G03C 1/815; C08K 5/29; C08K 5/17; C08K 5/07
(52) U.S. Cl. ................ 430/512; 430/220; 430/527; 430/530; 430/533; 430/939; 428/480; 524/194; 524/237; 524/359
(58) Field of Search ................. 430/533, 512, 430/220, 939, 527, 530; 428/480; 524/194, 237, 359

(56) References Cited

U.S. PATENT DOCUMENTS

| 5,558,912 | A | * | 9/1996 | Fagerburg et al. | 428/480 |
| 5,593,818 | A | * | 1/1997 | Kawamoto | 430/512 |
| 5,759,700 | A | * | 6/1998 | Waterman | 428/480 |
| 5,891,824 | A | * | 4/1999 | Simpson et al. | 428/480 |
| 5,989,794 | A | * | 11/1999 | Marien | 430/512 |
| 6,270,888 | B1 | * | 8/2001 | Rutter et al. | 428/480 |
| 6,368,724 | B1 | * | 4/2002 | Fagerburg | 428/480 |
| 2003/0004237 | A1 | * | 1/2003 | Mutschall et al. | 524/100 |
| 2003/0012937 | A1 | * | 1/2003 | Mutschall et al. | 428/480 |

FOREIGN PATENT DOCUMENTS

| JP | 9-297382 | 11/1997 |
| JP | 10-83049 | 3/1998 |
| JP | 11-269565 | 5/1999 |
| JP | 2001-92082 | 4/2001 |

OTHER PUBLICATIONS

Patent Abstract of Japan, 09–297382, Nov. 18, 1997.
Patent Abstract of Japan, 10–08349, Mar. 31, 1998.
Patent Abstract of Japan, 2001–092082, Apr. 6, 2001.

* cited by examiner

Primary Examiner—Richard L. Schilling
(74) Attorney, Agent, or Firm—Sughrue Mion, PLLC (57) ABSTRACT

The present invention provides a silver halide photographic photosensitive material in which a silver halide photosensitive layer is disposed on a transparent polyethylene terephthalate (PET) film into which an ultraviolet light absorber has been kneaded, wherein the ultraviolet light absorber is at least one kind of ultraviolet light absorber characterized in that (i) a loss of mass is not greater than 10% when heated to 300° C. at a heating rate of 10° C./minute in a nitrogen gas atmosphere, and/or (ii) a difference between a b-value of a sheet having a thickness of 1.5 mm formed after heating for 1 minute at 300° C., a PET resin including an amount of 0.4% by mass of the ultraviolet light absorber and having a water content of not greater than 50 ppm, and a b-value of a sheet having a thickness of 1.5 mm formed after heating the PET resin for 8 minutes at 300° C., is not greater than 3.0.

19 Claims, 3 Drawing Sheets

SILVER HALIDE PHOTOGRAPHIC PHOTOSENSITIVE MATERIAL HAVING A POLYETHYLENE TEREPHTHALATE FILM BASE SUPPORT INTO WHICH ULTRAVIOLET LIGHT ABSORBER IS KNEADED

BACKGROUND OF THE INVENTION

1. Field of the Invention

The present invention relates to an image-forming element comprising a transparent support having an image-forming layer provided thereon, for example, a silver halide photosensitive image-forming layer, particularly to a monosheet-type instant photograph, and also to a base support.

2. Description of the Related Art

Various kinds of image-forming elements comprising a transparent support, having an image-forming layer are known. One kind of image-forming element is a so-called "monosheet-type instant photograph", which is generally used in the form of a film unit having a combination of the following: a photosensitive sheet comprising at least one photosensitive silver halide emulsion layer disposed on a support, a cover sheet having at least an acid polymer layer for the purpose of neutralization disposed on another support, and a pressure-breakable container which is disposed between the photosensitive sheet and the cover sheet and contains an alkaline developing solution.

The surface of the photosensitive sheet on the side not having the photosensitive silver halide emulsion layer and the surface of the cover sheet on the side not having the acid polymer layer, that is, the surfaces of the outermost layers of the film unit are often provided with a coating layer containing a lubricating agent, an ultraviolet light absorber, and others in consideration of unloadability from camera and prevention of ultraviolet-induced deterioration of images. Previously, since this coating layer was formed on a coating layer of gelatin for photographic use provided on a support, acetylcellulose was used as a binder in the coating layer. However, when an acetylcellulose coating layer including a lubricant and an ultraviolet absorbent was formed on a gelatin layer, a layer adhesion problem would occur such that the coating layer would easily peel from the support.

In order to overcome this layer adhesion problem, patent applications have disclosed binder resins for the coating layer containing ultraviolet light absorber to be provided on the gelatin layer. For example, Japanese Patent Application Laid-Open (JP-A) No. 9-297382 discloses the use of acetylcellulose containing a maleic anhydride copolymer and a compound having at least two isocyanate groups; and JP-A No. 10-83049 discloses the use of acetylcellulose containing a maleic monoester copolymer and a compound having at least two isocyanate groups.

The layer-adhesion problem can be solved using the aforementioned specific binders. However, the coating layers of the supports provided with the coating layer disclosed in JP-A No. 9-297382 and JP-A No. 10-83049 use coating liquids with ultraviolet absorbents and binders dissolved in solvents. Therefore the coating layer can be improved with respect to its environmental impact. In addition, since the ultraviolet light absorber incorporated in the coating layer bleeds out to the surface of the layers over time to thereby greatly reduce the transparency of the support, and the image density when seen from the back is greatly lowered. Another imaging performance problem is that after bleeding out the ultraviolet light absorber migrates to the silver halide emulsion layer during the manufacturing process and then, comes into contact with the alkaline developing solution after being removed from a camera, thereby producing a yellow discoloration.

Japanese Patent Application No. 11-269565 filed by the present applicant discloses a monosheet-type instant photograph, designed to prevent both the bleeding out of the ultraviolet light absorber on the outermost layer side of the film unit and the bleeding-induced image density reduction, by using of an ultraviolet light absorber having a carboxyl or sulfo group in the molecule and a specific chemical structure and by forming as a coating layer an acetylcellulose layer containing a compound having at least two isocyanate groups. However, even this monosheet-type instant photograph cannot completely prevent bleeding out. Moreover, the coating layer is formed by coating the coating layer components with an organic-solvent, thus the environmental problems remain.

In response to the adverse environmental effects caused by coating the support with the solution containing a solvent, the present inventors attempted to incorporate the ultraviolet light absorber in a water-based coating liquid to form the coating layer. However, it was impossible to incorporate the ultraviolet light absorber in an amount necessary to exhibit a sufficient ultraviolet absorbency into a thin layer of the coating layer and, in addition, the bleeding out problem was not improved.

As stated above, the manufacture of a high-performance monosheet-type instant photograph, free of the ultraviolet light absorber bleeding out, by a method having little adverse effect on the environment has not yet been established.

SUMMARY OF THE INVENTION

In view of the above, it is an object of the present invention to provide an image-forming element and a base support free of a bleeding out of an ultraviolet light absorber by kneading an ultraviolet light absorber into the support of the image-forming element having an image-forming layer on one of the sides of the support.

The object of the present invention can be achieved by providing the following image-forming elements.

According to the first aspect, the present invention is a base support at least having a transparent polyester film containing an ultraviolet light absorber incorporated thereinto by kneading, wherein the ultraviolet light absorber is at least one kind of ultraviolet absorbers characterized by exhibiting a loss of mass of not greater than 10% when heated to 300° C. at a heating rate of 10° C./minute under a nitrogen gas atmosphere.

According to the second aspect, the present invention is a base support at least having a transparent polyester film containing an ultraviolet light absorber incorporated thereinto by kneading, wherein the ultraviolet light absorber is at least one kind of ultraviolet absorbers characterized in that the difference between the b-value of the sheet having a thickness of 1.5 mm formed after heating a polyester resin, which contains an amount of 0.4% by mass of the ultraviolet light absorber and has a water content of 50 ppm, for 1 minute at 300° C. and the b-value of the sheet having a thickness of 1.5 mm formed after heating the same resin for 8 minutes is not greater than 3.0.

According to the third aspect, the present invention is a base support at least having a transparent polyester film containing an ultraviolet light absorber incorporated thereinto by kneading, wherein the ultraviolet light absorber is at least one kind of ultraviolet absorbers characterized by exhibiting a loss of mass of not greater than 10% when heated to 300° C. at a heating rate of 10° C./minute under a nitrogen gas atmosphere and characterized in that the difference between the b-value of the sheet having a thickness of 1.5 mm formed after heating a polyester resin, which contains an amount of 0.4% by mass of the ultraviolet light absorber and has a water content of 50 ppm, for 1 minute at 300° C. and the b-value of the sheet having a thickness of 1.5 mm formed after heating the same resin for 8 minutes is not greater than 3.0.

According to another aspect, the present invention is a base support at least having a transparent polyester film containing an ultraviolet light absorber incorporated thereinto by kneading, wherein the ultraviolet light absorber is at least one kind of ultraviolet absorbers represented by the following general formula (1):

General Formula (1)

wherein $X^1$, $Y^1$, and $Z^1$ each independently represents an alkyl group, an aryl group, an alkoxy group, an aryloxy group, an alkylthio group, an arylthio group, or a heterocyclic group, which groups may each be substituted or unsubstituted, with the proviso that at least one of $X^1$, $Y^1$, and $Z^1$ represents a substituent represented by the following structural formula (A):

Structural formula (A)

wherein $R^1$ and $R^2$ each independently represents a hydrogen atom, a halogen atom, an alkyl group, an alkenyl group, an aryl group, an alkoxy group, an aryloxy group, an acyloxy group, an alkylthio group, an arylthio group, an amino group, an acyl group, an oxycarbonyl group, a carbamoyl group, a sulfamoyl group, a carboxyl group or a salt thereof, or a sulfo group or a salt thereof, which groups may each be substituted or unsubstituted, with the proviso that adjacent $R^1$ and $R^2$ may join together to form a ring.

According to still other aspect, the present invention is an image-forming element comprising a base support and an image-forming layer on one of the sides of the support, wherein the base support is the base support described above.

DETAILED DESCRIPTION OF THE PREFERRED EMBODIMENTS

An image forming element of the present invention is characterized by having a transparent polyester support into which at least one ultraviolet absorbent having no less than one of the following characteristics is kneaded: both a loss of mass of no greater than 10% and a low volatility when heated to 300° C. at a rate of 10° C./minute under a nitrogen atmosphere, and a difference in b-values (referred to hereinafter as "heat resistance") of no more than 3.0. The heat resistance is obtained by first forming 1.5 mm thick sheets from a polyester resin having a moisture content of no more than 50 ppm and containing 0.4% by mass of the ultraviolet absorbent. The sheets are then heated at 300° C., one for one minute, and another for eight minutes, and measuring the difference between the b-values of the sheets.

When an ultraviolet absorbent, having both a loss of mass of no greater than 10% and a low volatility when heated to 300° C. at a rate of 10° C./minute in a nitrogen atmosphere is used, then after the ultraviolet absorbent is heated and kneaded together with the transparent polyester resin, the amount of the ultraviolet absorbent which vaporizes from the film immediately after being extruded from the die section is reduced. Therefore, a reduction in ultraviolet absorbency is prevented, or alternatively, the use of a large amount of the ultraviolet light absorber is made unnecessary. Moreover, if a large amount of the ultraviolet light absorber vaporizes, the ultraviolet light absorber, which is in a vaporized (sublimated) state in the production line adhere to the support film traveling down the production line may contaminate the production line. Such problems can be avoided with the present invention.

The loss of mass is preferably not greater than 5% and more preferably not greater than 1%. Generally, by setting the molecular weight of the ultraviolet light absorber to 400 or more, the loss of mass can be limited to a value not greater than 5%.

Examples of ultraviolet light absorber having the above characteristics, include ultraviolet absorbers represented by the general formula (1), benzophenone-based ultraviolet absorbers designated UVA(3) or UVA(4), benzotriazole-based ultraviolet absorbers designated UVA(6), UVA(7), UVA(9), or UVA(10), salicylic ester-based ultraviolet absorbers, cyanoacrylate-based ultraviolet absorbers, benzoxazine-based ultraviolet absorbers, triazine/coumarin copolymer-based ultraviolet absorbers.

The ultraviolet light absorber characterized by the aforementioned heat resistance is stable and does not undergo thermal decomposition at a temperature (e.g., 300° C.) at which the polyester resin is melt-blended. For this reason, if this ultraviolet light absorber is used on the polyester resin support, the yellowing or reduction of ultraviolet light absorbency of the support film due to decomposition of the ultraviolet light absorber can be suppressed. At the same time, the decomposition of the polyester resin (i.e., a reduction of the molecular weight of the polyester resin) caused by decomposition of the ultraviolet light absorber can also be prevented. The difference between the b-values is preferably not greater than 2.0 and more preferably not greater than 1.0.

Examples of the ultraviolet light absorber having the aforementioned characteristics include ultraviolet absorbers having the structural formulae represented by the following general formula (1), benzoxazine-based ultraviolet absorbers, and others.

The use of an ultraviolet light absorber having both of the two aforementioned characteristics enables the above-mentioned effects to be produced together. Examples of ultraviolet absorbers having these characteristics include ultraviolet absorbers having the structural formulae represented by, for example, general formula (1), benzoxazine-based ultraviolet absorbers, and others.

The image forming element of the present invention comprised with the support having ultraviolet absorbency can be easily made if the ultraviolet absorbent having the aforementioned volatility and/or heat resistance is kneaded into the support while the support is being formed. Therefore, the traditional step, in which a coating liquid composed of an ultraviolet light absorber and a binder dissolved in an organic solvent is coated on the support, can be omitted and, thus, adverse effects on the environment are lessened.

The image-forming element of the present invention is also characterized by the use of the ultraviolet light absorber represented by the following general formula (1). The ultraviolet light absorber represented by the general formula (1) is stable and exhibits low-volatility at high temperatures. Therefore, the ultraviolet absorbent is stable and does not undergo thermal decomposition even at the temperatures, for example, 300° C., at which the ultraviolet absorbent is melted and kneaded with the polyester resin, nor does the ultraviolet absorbent vaporize immediately after being extruded from the die section. Therefore, yellowing or reduction of ultraviolet light absorbency of the film can be suppressed. Needless to say, such advantages as simplification of the manufacturing process are also brought about.

General Formula (1)

wherein $X^1$, $Y^1$, and $Z^1$ each independently represents an alkyl group, an aryl group, an alkoxy group, an aryloxy group, an alkylthio group, an arylthio group, or a heterocyclic group, which groups may each be substituted or unsubstituted, with the proviso that at least one of $X^1$, $Y^1$, and $Z^1$ represents a substituent represented by the following structural formula (A):

Structural formula (A)

wherein $R^1$ and $R^2$ each independently represents a hydrogen atom, a halogen atom, an alkyl group, an alkenyl group, an aryl group, an alkoxy group, an aryloxy group, an acyloxy group, an alkylthio group, an arylthio group, an amino group, an acyl group, an oxycarbonyl group, a carbamoyl group, a sulfamoyl group, a carboxyl group or a salt thereof, or a sulfo group or a salt thereof, which groups may each be substituted or unsubstituted. Adjacent $R^1$'s and $R^2$'s may join together to form a ring.

The alkyl group for $X^1$, $Y^1$, $Z^1$, $R^1$, or $R^2$ in the general formula (1) and the structural formula (A) preferably has 1 to 20 carbon atoms and may include a substituent. Examples of the substituent include a hydroxyl group, a cyano group, a nitro group, a halogen atom (e.g., chlorine, bromine, or fluorine), an alkoxy group (e.g., methoxy, ethoxy butoxy, octyloxy, or phenoxyethoxy), an aryloxy group (e. g., phenoxy), an ester group (e.g., methoxycarbonyl, ethoxycarbonyl, octyloxycarbonyl, or dodecyloxycarbonyl), a carbonyloxy group (e.g., ethylcarbonyloxy, heptylcarbonyloxy, or phenylcarbonyloxy), an amino group (e.g., dimethylamino, ethylamino, or diethylamino), an aryl group (e.g., phenyl, tolyl, or 4-methoxyphenyl), a carbonylamide group (e.g., methylcarbonylamide or phenylcarbonylamide), a carbamoyl group (e.g., ethylcarbamoyl or phenylcarbamoyl), a sulfonamide group (e.g., methanesulfonamide or benzenesulfoneamide), a sulfamoyl group (e.g., butylsulfamoyl, phenylsulfamoyl, or methyloctylaminosulfamoyl), a carboxyl group and a salt thereof, and a sulfo group and a salt thereof. More specific examples include such groups as methyl, ethyl, propyl, iso-propyl, n-butyl, sec-butyl, t-butyl, pentyl, t-pentyl, hexyl, octyl, 2-ethylhexyl, t-octyl, decyl, dodecyl, hexadecyl, octadecyl, benzyl, phenethyl, cyclopropyl, cyclopentyl, cyclohexyl, and bicyclo[2,2,2] octyl, and groups including the substituents listed above.

The aryl group for $X^1$, $Y^1$, $Z^1$, $R^1$, or $R^2$ in the general formula (1) and the structural formula (A) preferably has 6 to 10 carbon atoms and may include a substituent. Examples of the substituent include an alkyl group (e.g., methyl, ethyl, propyl, iso-propyl, butyl, sec-butyl, t-butyl, pentyl, t-pentyl, octyl, decyl, dodecyl, tetradecyl, or hexadecyl) and groups listed as substituents that the preceding alkyl groups may include. Specific examples of the aryl group include phenyl and naphthyl.

The alkoxy group for $X^1$, $Y^1$, $Z^1$, $R^1$, or $R^2$ in the general formula (1) and the structural formula (A) preferably has 1 to 20 carbon atoms. Examples of alkoxy groups include methoxy, ethoxy, butoxy, iso-butoxy, n-octoxy, iso-octoxy, dodecyloxy benzyloxy, and octadecyloxy. These groups may be substituted for by the preceding substituents listed previously as substituents that the preceding alkyl groups may include.

The aryloxy group for $X^1$, $Y^1$, $Z^1$, $R^1$, or $R^2$ in the general formula (1) and the structural formula (A) preferably has 6 to 20 carbon atoms. Examples of aryloxy groups include phenoxy and naphthoxy. These groups may be substituted for by the substituents listed as substituents that the preceding aryl groups may include.

The alkylthio group for $X^1$, $Y^1$, $Z^1$, $R^1$, or $R^2$ in the general formula (1) and the structural formula (A) preferably has 1 to 20 carbon atoms. Examples of alkylthio groups include methylthio, hexylthio, octylthio, and hexadecylthio.

The arylthio group for $X^1$, $Y^1$, $Z^1$, $R^1$, or $R^2$ in the general formula (1) and the structural formula (A) preferably has 6 to 10 carbon atoms. Examples of arylthio groups include phenylthio and naphthylthio. These alkylthio groups and arylthio groups may be substituted for by the substituents listed as substituents that the preceding alkyl or aryl groups may include.

Examples of the heterocyclic group for $X^1$, $Y^1$, or $Z^1$ in the general formula (1) include heterocycles such as furan, thiophene, indole, pyrrole, pyrazole, imidazole, and pyridine. These heterocyclic groups may be substituted for by the substituents listed as substituents that the preceding aryl groups may include.

The alkenyl group for $R^1$ or $R^2$ in the structural formula (A) preferably has 3 to 20 carbon atoms. Examples of alkenyl groups include allyl, 2-butenyl, 3-butenyl, and oleyl. These alkenyl groups may be substituted for by the substituents listed as substituents that the preceding alkyl groups may include.

The acyloxy group for $R^1$ or $R^2$ in the structural formula (A) preferably has 2 to 20 carbon atoms. Examples of acyloxy groups include acetyloxy, hexanoyloxy, decanoyloxy, stearoyloxy, and benzoyloxy. These acyloxy groups may be substituted for by the substituents listed as substituents that by the preceding aryl groups may include.

The amino group for $R^1$ or $R^2$ in the structural formula (A) is preferably a substituted or unsubstituted amino group having 0 to 40 carbon atoms. Examples of amino groups include unsubstituted amino, methylamino, dimethylamino, diethylamino, octylamino, dihexylamino, distearylamino, diisobutylamino, anilino, diphenylamino, methylphenylamino, formamide, acetylamino, hexanoylamino, decanoylamino, stearoylamino, benzoylamino, methanesulfonamide, ethanesulfonamide, nonanesulfonamide, butanesulfonamide, dodecanesulfonamide, octadecanesulfonamide, benzenesulfonamide, methoxycarbonylamino, phenoxycarbonylamino, carbamoylamino, cyclohexylcarbamoylamino, and diethylcarbamoylamino. These amino groups may be substituted for by the substituents listed as substituents that the preceding aryl groups may include.

The acyl group for $R^1$ or $R^2$ in the structural formula (A) preferably has 1 to 20 carbon atoms. Examples of acyl group include acetyl, butanoyl, pivaloyl, octanoyl, hexadecanoyl, and benzoyl. These acyl groups may be substituted for by the substituents listed as substituents that the preceding aryl groups may include.

The oxycarbonyl group for $R^1$ or $R^2$ in the structural formula (A) preferably has 2 to 20 carbon atoms. Examples of oxycarbonyl groups include methoxycarbonyl, ethoxycarbonyl, butoxycarbonyl, isobutoxycarbonyl, heptyloxycarbonyl, tetradecyloxycarbonyl, octadecyloxycarbonyl, and phenoxycarbonyl. These oxycarbonyl groups may be substituted for by the substituents listed as substituents that the preceding aryl groups may include.

The carbamoyl group for $R^1$ or $R^2$ in the structural formula (A) preferably has 1 to 20 carbon atoms. Examples of carbamoyl groups include unsubstituted carbamoyl, methylcarbamoyl, propylcarbamoyl, diethylcarbamoyl, octylcarbamoyl, dodecylcarbamoyl, hexadecylcarbamoyl, octadecylcarbamoyl, and phenylcarbamoyl. These carbamoyl groups may be substituted for by the substituents listed as substituents that the preceding aryl groups may include.

The sulfamoyl group for $R^1$ or $R^2$ in the structural formula (A) preferably has 0 to 20 carbon atoms. Examples of sulfamoyl groups include unsubstitutable sulfamoyl, ethylsulfamoyl, butylsulfamoyl, heptylsulfamoyl, tetradecylsulfamoyl, dibutylsulfamoyl, octadecylsulfamoyl, and phenylsulfamoyl. These sulfamoyl groups may be substituted for by the substituents listed as substituents that the preceding aryl groups may include.

Examples of the halogen atom for $R^1$ or $R^2$ in the structural formula (A) include fluorine, chlorine, and bromine.

The molecular weight of ultraviolet light absorber represented by the general formula (1) is preferably 400 or more. Ultraviolet light absorbers whose molecular weights are 400 or more have particularly low volatility and therefore it does not contaminate the production line, and can provide the necessary ultraviolet light absorbtion capability even when added in small amounts.

Figure 1:
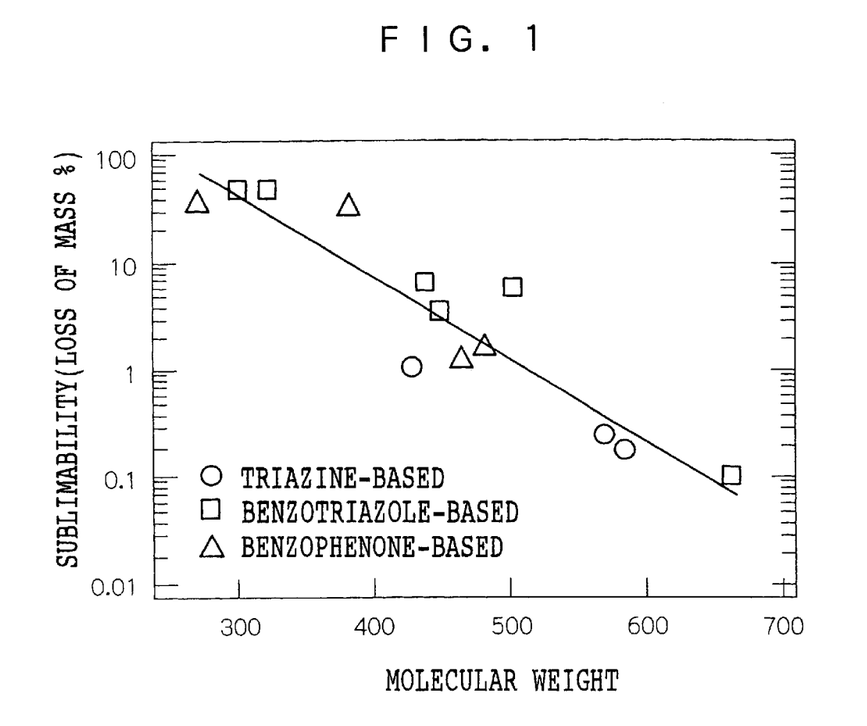
FIG. 1 is a graph illustrating the relationships between the molecular weights and sublimabilities of ultraviolet absorbers.

Table 1 shows the molecular weights and volatility (sublimability) of ultraviolet absorbers designated UVA (1) to UVA (13). The volatility represents the loss of mass when each ultraviolet light absorber is heated to 300° C. at a rate of 10° C./minute nitrogen gas atmosphere. FIG. 1 is a graph in which molecular weight is plotted along the x-axis and sublimability is plotted along the x-axis. As can be seen in Table 1 and FIG. 1, the volatility of ultraviolet absorbers largely depends on the molecular weights thereof, and the volatility can be limited to 10% by mass or less if the molecular weight is 400 or more.

TABLE 1

TABLE 1-continued

UVA (7)

UVA (8)

UVA (9)

UVA (10)

UVA (11)

TABLE 1-continued

UVA (12)

UVA (13)

| ultraviolet absorbers | | molecular weight | loss of mass (%) |
|---|---|---|---|
| benzophenone | UVA (1) | 274 | 37.49 |
| | UVA (2) | 382 | 33.65 |
| | UVA (3) | 468 | 1.30 |
| | UVA (4) | 483 | 1.50 |
| benzotriazole | UVA (5) | 323 | 47.96 |
| | UVA (6) | 436 | 5.99 |
| | UVA (7) | 447 | 3.40 |
| | UVA (8) | 300 | 48.00 |
| | UVA (9) | 658 | 0.10 |
| | UVA (10) | 499 | 5.53 |
| triazine | UVA (11) | 573 | 0.15 |
| | UVA (12) | 425 | 1.00 |
| | UVA (13) | 583 | 0.20 |

Figure 2:
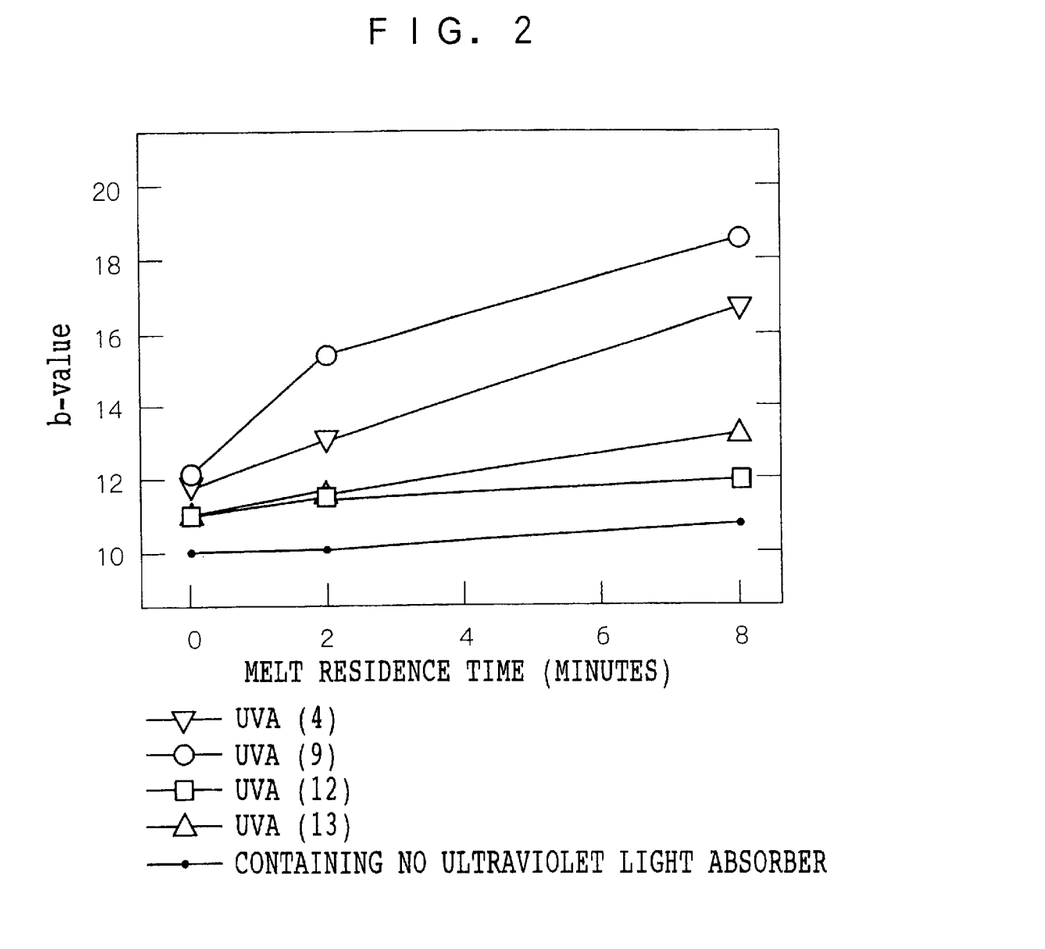
FIG. 2 is a graph illustrating the relationship between melt residence times and b-values of polyester resins containing the ultraviolet absorbers of the present invention incorporated into the polyester resin by kneading.
Figure 3:
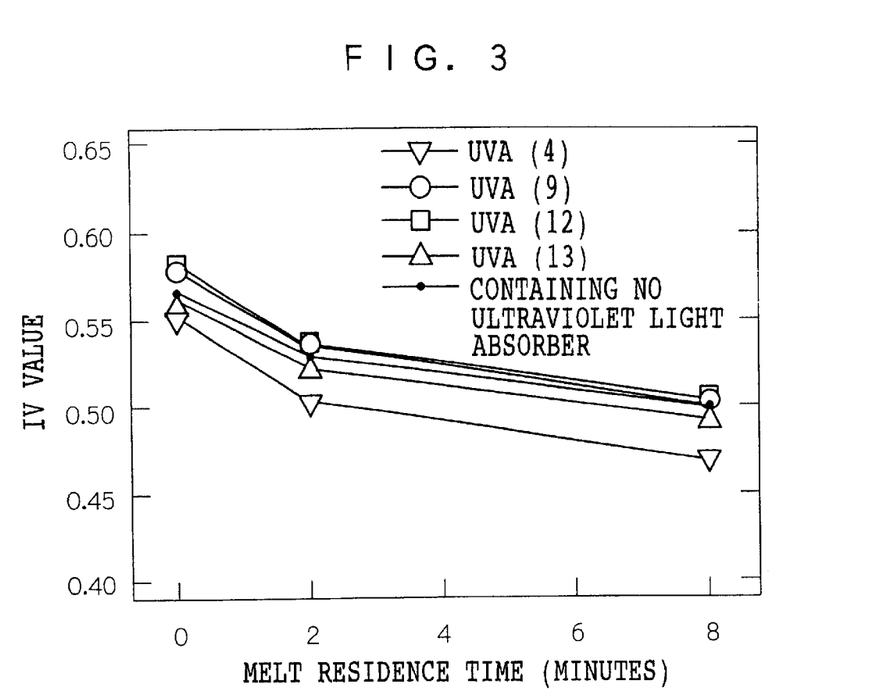
FIG. 3 is a graph illustrating the relationship between melt residence times and IV values of polyester resins containing the ultraviolet absorbers of the present invention incorporated into the polyester resin by kneading.

Next, the heat resistance of the ultraviolet absorbers designated UVA(4), UVA(9), UVA(12), and UVA(13), respectively, is shown below (the heat resistance includes not only the aforementioned b-value but also the IV value described below).

The heat resistance was measured in the following way. Ultraviolet absorbers in a net quantity of 0.4% by mass and $TiO_2$ particles in a net quantity of 0.2% by mass (for the purpose of haze control in a diffusion transfer photographic material), the quantities based on the total amount of polyester resin, were added to the polyester resin. The mixture was then dried at 180° C. for 8 hours in a vacuum oven. After that, the then mixture was formed into a sheet having a thickness of about 1.5 mm by using an injection molding machine (NEOMAT 150/75, manufactured by Sumitomo Heavy Industries, Ltd.) for residence times of 0, 2, and 8 minutes, respectively, at a temperature of 300° C. The b-values and the IV values of the sheets thus formed were measured. The b-value refers to the b-value based on the CIELAB color system and IV is the abbreviation of Intrinsic Viscosity. The b-value was measured by means of a color difference meter (model SZ-YΣ90, manufactured by Nihon Denshoku Kogyo Co., Ltd.).

The ultraviolet light absorber and $TiO_2$ particles were kneaded into the polyester resin in advance in the form of kneaded chips.

The results are shown in FIG. 2 and FIG. 3. From these figures, it can be seen that a triazine-based ultraviolet light absorber in particular leads to excellent heat resistance.

In the present invention, the image-forming element may have a coating layer comprising a water-dispersible resin on the surface of the support opposite to the image-forming layer side. In view of unloadability from camera, it is preferable for the coating layer to have a coefficient of kinetic friction of not greater than 0.30. In order for a coefficient of kinetic friction of the coating layer to be reduced to a value not greater than 0.30, a lubricating agent, for example, may be added to the coating layer. Further, a surfactant, a matting agent, a hardener, a hardening aid, an antiseptic, and a pH controlling agent, for example, may be added to the coating layer.

Examples of the water-dispersible resin include an acrylic resin, a polyester resin, a polyurethane resin, a polystyrene resin, SBR, PVDC, polyethylene, a polyolefin resin such as polypropylene, and copolymers thereof. These resins exhibit excellent water resistance and adhesion to the polyester film.

Preferred examples of the lubricating agent include waxes having a long-chain hydrocarbon group (including a surfactant), inorganic particles such as colloidal silica particles, and organic particles such as polyolefin particles. Particularly preferred is a wax having a long-chain saturated hydrocarbon group of 12 to 24 carbon atoms. The amount of the lubricating agent to be added is preferably 1 to 20% by mass based on the dry solid components of the coating layer.

The coating layer can be formed by a water-dispersible liquid prepared by dispersing the above-described water-dispersible resin and additives such as a lubricating agent in water using a surfactant. The thickness of the coating layer is preferably about 0.01 to 1.0 μm.

In the image-forming element of the present invention, it is preferable to provide a layer (this layer is referred to as an undercoat layer) having a surface resistance (SR) of $10^6$ to $10^{12}$ Ω· cm on the surface of the base support opposite to the image-forming layer side, preferably between the aforementioned coating layer and the support. By making the surface resistance of the undercoat layer fall within the aforementioned range, the electrostatic failure problem during fabrication can be alleviated and fogging can be effectively prevented.

In order to make the surface resistance of the undercoat layer have a value within the above-mentioned range, electroconductive particles can be added into the undercoat layer. Examples of electroconductive particles include particles of tin oxide, indium oxide, zinc oxide, aluminum oxide, and titanium oxide. Among these particles, tin oxide doped with antimony is preferable. Particularly preferred is an antimony-doped electroconductive tin oxide particle having an acicular structure in which the ratio of the major axis to the minor axis is from 3 to 50. Since it is possible to obtain a necessary level of electrical conductivity by using a small amount of the electroconductive tin oxide particles having the above-mentioned acicular structure, the undercoat layer is hardly tinted with a bluish color inherent to tin oxide. Accordingly, problems like the Dmin becoming higher (the color of the background becoming dim) and the photographic performance becoming inferior can be avoided. Further more, a hardener, a surfactant, a matting agent, an antiseptic, a pH controlling agent, and others may be incorporated in the undercoat layer.

The amount of the electroconductive particles to be added is decided in order to obtain the aforementioned surface resistance of the undercoat layer, and it is generally 30 to 70% by mass based on the solid components of the undercoat layer.

A water-dispersible resin can be used as a binder in the undercoat layer. Examples of the water-dispersible resins include acrylic resins, polyester resins, polyurethane resins, polystyrene resins, SBR's, and PVDC's. These resins exhibit excellent water resistance and adhesion to the polyester film. The coating layer can be formed by coating a coating liquid for forming the under layer. The coting liquid is prepared by dispersing a binder resin, electroconductive particles, and others in water using a surfactant, and then drying the layer. The thickness of the undercoat layer is preferably 0.05 to 5 μm.

Since the coating layer or the undercoat layer in the present invention contains a water-dispersible resin having excellent water resistance and adhesion to the polyester support, the aforementioned delamination and water resistance problems are solved.

The transparent polyester support of the present invention preferably contains a white pigment such as a titanium oxide pigment in addition to the ultraviolet light absorber. The white pigment is added in order to increase the haze of the transparent polyester support, making it possible to prevent the photosensitive layer from being fogged by the irradiation of light on the end face of the support during the manufacturing process. The amount of the titanium oxide to be added is preferably 0.005 to 0.05% by mass.

Examples of the transparent polyester support which can be used in the present invention include polyethylene terephthalate, polyethylene naphthalate, and a copolymer or a mixture.

The image-forming layer of the present invention can be a silver halide photosensitive material layer. Further, the silver halide photosensitive material layer can be a diffusion transfer photographic material layer. The diffusion transfer photographic material layer can utilize all of the technical matters described in Japanese Patent Application No. 11-269565, paragraphs 0050 to 0079.

EXAMPLES

The present invention is explained in more detailed by the Examples which follow, although the present invention is not limited to these Examples.

Example 1

The ultraviolet absorbent denoting UVA (12) and $TiO_2$ particles were pre-kneaded into a polyester resin and shaped into chips. These chips were then blended with "ordinary" chips of polyester resin. The net amount of the ultraviolet light absorber was adjusted to 0.4% by mass and the net amount of the $TiO_2$ particles was adjusted to 0.18% by mass based on the total mount of polyester resin. The material comprising these chips was dried in a Henschel mixer and in a paddle drier so that the water content was reduced to 50 ppm or less. Afterwards, the material was melted in an extruder whose temperature was set to 280 to 300° C. The molten polyester resin was extruded from the die section onto chiller rollers impressed with an electrostatic charge to thereby obtain an amorphous base. The amorphous base was drawn, at a draw ratio of 3.3, in the direction of the flow of the base and was then stretched at a ratio of 3.9 in the direction of base width. In this way, a film having a thickness of 97±2 μm (film sheet 1) was obtained.

The bleeding out problem of the ultraviolet absorber was not found in the film thus obtained. The film sheet was subjected to test environment conditions of 60° C. and a relative humidity of 90% for 10 days, and thereafter the bleeding out of the ultraviolet light absorber to the surface was visually inspected.

Example 2

A film having a thickness of 97 μm (film sheet 2) was manufactured in the same way as in Example 1, except that the chip material that was used contained the ultraviolet light absorber UVA (12) in a net amount of 0.29% by mass, the ultraviolet light absorber UVA (13) in a net amount of 0.17% by mass, and the $TiO_2$ particles in a net amount of 0.2% by mass based on the amount of the total polyester resin.

The bleeding out problem of the ultraviolet light absorber was not observed in the film thus obtained.

Example 3

A film having a thickness of 97 μm (film sheet 3) was manufactured in the same way as in Example 1, except that the chip material that was used contained the ultraviolet light absorber UVA (12) in a net amount of 0.24% by mass, the ultraviolet light absorber UVA (13) in a net amount of 0.24% by mass, and the $TiO_2$ particles in a net amount of 0.2% by mass based on the amount of the total polyester resin.

The bleeding out problem of the ultraviolet light absorber was not found in the film thus obtained.

Example 4

The 97 μm-thick film sheet described in Example 3 was conveyed at a speed of 30 m/minute, and subjected to a corona-discharge treatment in which the gap between the corona discharge electrode and the support was 1.8 mm and 200 W of power was supplied. Next, a first undercoat layer and a second undercoat layer were formed by coating the film with coating liquids of the following aqueous compositions to make the first undercoat layer and then the second undercoat layer, successively in that order, by means of a coating bar. A coating amount of about 5.7 $cc/m^2$ was used for each coat. Each of the coating layers was dried at 180° C. for 1 minute. In this way, a film sheet 4 was manufactured.

| Composition of the coating liquid for the first undercoat layer | |
|---|---|
| Polyacrylic resin (JULYMER ET-410, manufactured by Nihon Pure Chemicals Co., Ltd., solid content: 30%) | 24 parts by mass |
| Acicular tin oxide (FS-10D, manufactured by Ishihara Sangyo Kaisha, Ltd., solid content: 20%) | 50 parts by mass |
| Epoxy-based hardener (EX614B, manufactured by Nagase Chemical Industries, Ltd., solid content: 100%) | 2.2 parts by mass |
| Nonionic surfactant (Compound 14) (solid content: 100%) | 0.8 parts by mass |
| Anionic surfactant (SANDET BL, manufacture by Sanyo Chemical Industries, Ltd., solid content: 44.6%) | 1.8 parts by mass |
| Distilled water | 921.2 parts by mass |
| Composition of the coating liquid for the second undercoat layer | |
| Polyacrylic resin (JULYMER ET-410, manufactured by Nihon Pure Chemicals Co., Ltd., solid content: 30%) | 15 parts by mass |
| Colloidal silica particles (SNOWTEX C, manufactured by Nissan Chemical Industries, Ltd., solid content: 20%) | 11 parts by mass |
| Epoxy-based hardener (EX614B, manufactured by Nagase Chemical Industries, Ltd., solid content: 100%) | 1.3 parts by mass |
| Anionic surfactant (Compound 15) (solid content: 100%) | 1.1 parts by mass |
| Nonionic surfactant (Compound 16) (solid content: 100%) | 0.5 parts by mass |
| Anionic surfactant (SANDET BL, manufactured by Sanyo Chemical Industries, Ltd., solid content: 44.6%) | 3.4 parts by mass |
| Distilled water | 967.7 parts by mass |

Compound 14

Compound 15

Compound 16

Example 5

A film sheet 5 was manufactured in the same way as described in Example 4, except that the coating liquid for the second undercoat layer 4 was replaced with the following coating liquid.

| Composition of the Coating Liquid for the Second Undercoat Layer | |
|---|---|
| Polyacrylic resin (JULYMER ET-410, manufactured by Nihon Pure Chemicals Co., Ltd., solid content: 30%) | 15 parts by mass |
| Colloidal silica particles (SNOWTEX C, manufactured by Nissan Chemical Industries, Ltd., solid content: 20%) | 11 parts by mass |
| Epoxy-based hardener (EX614B, manufactured by Nagase Chemical Industries, Ltd., solid content: 100%) | 1.3 parts by mass |
| Wax based on stearic acid amide (HIMICRON G110, manufactured by Chukyo Yushi Co., Ltd., solid content: 27.5%) | 5.2 parts by mass |
| Nonionic surfactant (Compound 16) (solid content: 100%) | 0.5 parts by mass |
| Anionic surfactant (SANDET BL, manufactured by Sanyo Chemical Industries, Ltd., solid content: 44.6%) | 3.4 parts by mass |
| Distilled water | 963.5 parts by mass |

Example 6

A film sheet 6 was manufactured in the same way as described in Example 4, except that the coating liquid for the second undercoat layer 4 was replaced with the following coating liquid.

| Coating liquid for the second undercoat layer | |
|---|---|
| Polyacrylic resin (JULYMER ET-410, manufactured by Nihon Pure Chemicals Co., Ltd., solid content: 30%) | 15 parts by mass |
| Colloidal silica particles (SNOWTEX C, manufactured by Nissan Chemical Industries, Ltd., solid content: 20%) | 11 parts by mass |
| Melamine-based hardener (M-3, manufactured by Sumitomo Chemical Co., Ltd., solid content: 80%) | 1.3 parts by mass |
| Anionic surfactant (Compound 15) (solid content: 100%) | 0.9 parts by mass |
| Nonionic surfactant (Compound 16) (solid content: 100%) | 0.5 parts by mass |
| Anionic surfactant (SANDET BL, manufactured by Sanyo Chemical Industries, Ltd., solid content: 44.6%) | 3.4 parts by mass |
| Polyolefin-based matting agent (CHEMIPEARL W950, Mitsui Chemical Industries, Ltd., solid content: 40%) | 0.4 parts by mass |
| Distilled water | 967.5 parts by mass |

Comparative Example 1

Polyester chips, which comprised $TiO_2$ particles incorporated into a polyester resin by pre-kneading, were blended with ordinary polyester resin chips such that the net amount of the $TiO_2$ particles was 0.18% by mass based on the amount of the total polyester resin. The chip material was dried in a Henschel mixer and in a paddle drier so that the water content was reduced to 50 ppm or less. The material was then melted in an extruder whose temperature was set to from 280 to 300° C. The molten polyester resin was extruded from the die section onto electrostatically charged chiller rollers to thereby obtain an amorphous base. The amorphous base was drawn, at a draw ratio of 3.3, in the direction of the flow of the base and was then stretched at a ratio of 3.6 in the direction of base width, obtaining a film having a thickness of 97±2 μm.

The film was conveyed at a speed of 30 m/minute and subjected to a corona-discharge treatment in which the gap between the corona discharge electrode and the support was 1.8 mm and 200 W of power was supplied.

Next, the first undercoat layer and the second undercoat layer were formed by coating the film with the coating liquids of the compositions listed below to make the first undercoat layer and then the second undercoat layer, successively in that order, by means of a coating bar at a coating amount of about 5.7 cc/m² for the first undercoat layer and at a coating amount of about 8.7 cc/m² for the second undercoat layer. Each of the layers was dried at 180° C. for 1 minute.

| Composition of the coating liquid for the first undercoat layer | |
|---|---|
| SBR resin (Nipol Latex LX407C4C, manufactured by Nippon Zeon Co., Ltd., solid content: 43%) | 48 parts by mass |
| SBR resin (Nipol Latex LX407C4E, manufactured by Nippon Zeon Co., Ltd., solid content: 43%) | 14 parts by mass |
| Polyethyl acrylate resin (Compound 17) (20% aqueous solution) | 0.7 parts by mass |
| Polystyrene particles (Nipol Latex UFN1008, manufactured by Nippon Zeon Co., Ltd., solid content: 20%) | 0.2 parts by mass |
| Triazine-based hardener (Compound 18) (8% aqueous solution) | 11.7 parts by mass |
| Anionic surfactant (Compound 19) (solid content: 100%) | 0.1 parts by mass |
| Anionic surfactant (Compound 20) (solid content: 100%) | 0.3 parts by mass |
| Antiseptic (PROXEL LV, manufactured by Zeneka Co., Ltd., solid content: 20%) | 12 parts by mass |
| Distilled water | 913 parts by water |

Compound 17

Compound 18

Compound 19

Compound 20

| Composition of the coating liquid for the second undercoat layer | |
|---|---|
| Gelatin (solid content: 100%) | 70.6 parts by mass |
| Hardener (Compound 21) (20% aqueous solution) | 11.2 parts by mass |
| Cellulose resin (TC-5, manufactured by Shin-Etsu Chemical Co., Ltd., solid content: 100%) | 2.3 parts by mass |
| Antiseptic (Compound 22) (solid content: 3.5%) | 5 parts by mass |
| Acetic acid (manufactured by Daicel Ltd., solid content: 99%) | 10 parts by mass |
| Distilled water | 900.9 parts by mass |

Compound 21

Compound 22

Compound 22

The gelatin undercoat layer was overcoated with coating liquid having the composition listed below, forming the third coat layer at a thickness of 80 cc/m². The coating layer was dried at 110° C. for 5 minutes, manufacturing a film sheet 7.

| Composition of the coating liquid for the third under coat layer | |
|---|---|
| Acetyl cellulose (degree of acetylation: 55%) | 60 g |
| Isocyanate compound (Compound 23) (75% by mass solution in ethyl acetate) | 10 g |

-continued

Composition of the coating liquid for the third under coat layer

| | |
|---|---|
| Ultraviolet light absorber (Compound 24) | 1.5 g |
| Ultraviolet light absorber (Compound 25) | 4.5 g |
| Ultraviolet light absorber (Compound 26) | 1.5 g |
| Acetone | 750 cc |
| Diacetone alcohol | 250 cc |

Compound 23

$C_2H_5$—$C(CH_2OCONH(CH_2)_6NCO)_3$

Compound 24

[Structure: chlorobenzotriazole with hydroxyphenyl bearing $C_4H_9(t)$ and $CH_2CH_2CO_2H$ substituents]

Compound 25

[Structure: 2-hydroxybenzophenone with $O(CH_2)_3CO_2H$ substituent]

Compound 26

[Structure: benzotriazole with hydroxyphenyl bearing $C_8H_{17}(t)$]

Comparative Example 2

A film sheet 8 was prepared in the same way as described in Example 4, except that the ultraviolet light absorber was replaced with the ultraviolet light absorber in Table 1 having the structural formula designated UVA(1) (molecular weight: 274) and a loss of mass value of 37.49%.

Comparative Example 3

A sheet 9 was prepared in the same way as described in Example 4, except that the ultraviolet absorbent was replaced with an ultraviolet absorbent in Table 1 having the structural formula designated UVA(9) (molecular weight: 658). Despite having a low loss of mass value of 0.10%, ultraviolet absorbent UVA (9) has a difference in b-values of 4.3.

The amounts of bleeding out of the ultraviolet absorbers, adhesion between layers, clarity and yellowish tints indicated by the b-values of the background, coefficients of kinetic friction, surface resistivities (SR), and ultraviolet light (390 nm) transmittances of film sheets 4 to 9, which were manufactured in Examples 4 to 6 and Comparative Examples 1 to 3, were measured. Methods for these assessments are described below. The results are shown in Table 2.

<Test of Adhesion Between Layers>

A film sheet was coated and then stored for one week. Afterwards, an 11 cm×5 cm rectangle of the film was cut eight times on each of the diagonal axes of the coated surface with a cutter knife (NT Cutter A-300, manufactured by Nihon Transfer Paper Co., Ltd.) to the depth of the polyethylene terephthalate base. Next, a polyester adhesive tape (NITTO Tape No. 31, manufactured by NITTO DENKO Co., Ltd.) was applied uniformly to the cut film sheet surface and the adhesive tape was rapidly peeled off. Then, the area of the coating layer that was not removed by the adhesive tape was calculated and used for the assessment of the adhesion between layers.

<Yellowish Tints Indicated by the B-Values and Clarity (Dmin) of the Background>

The yellowish tints indicated by the b-values of the background and, the clarity (Dmin) were assessed by measuring the L-values of transmission (lightness) and b-values of the film sheets by means of a color difference meter (model SZ-Σ90, manufactured by Nihon Denshoku Kogyo Co., Ltd.).

An "○" denotes results for which the b-value was less than 3.0 and an "X" denotes results for which the b-value was 3.0 or greater.

<Coefficients of Kinetic Friction>

After the film sheets were stored for 3 days in an atmosphere maintained at 25° C. and 65% RH, coefficients of kinetic friction of the surface were measured using a tester for measuring coefficients of kinetic friction (manufactured by Toyo-Baldwin Co., Ltd.). That is, a steel ball having a diameter of 5 mm was brought into contact with a sample film surface by applying a load of 20 g and was caused to slide at a speed of 20 cm/minute. The resistance during the sliding was measured by means of a strain gauge so as to obtain the coefficient of kinetic friction.

<Surface Resistance (SR)>

After the film sheets were stored for 6 hours in an atmosphere maintained at 25° C. and 30% RH, the surface resistance (SR) was measured in the same atmosphere using a constant-voltage power source (TR-300C, manufactured by Takeda Riken Industries, Ltd.), an ampere meter (TR-8651, manufactured by the same company), and a sample chamber (TR-42, manufactured by the same company) in accordance with the procedure described in the item of resistance of JIS-K-6911-1979.

<350 nm Ultraviolet Light Transmittance>

For the measurement of the ultraviolet light transmittance of the film sheet, a spectrophotometer (U-best 550, manufactured by Nihon Bunko Co., Ltd.) in which the incident light had a wavelength of 350 nm was used.

An "○" denotes results when the transmittance was less than 1% and an "X" denotes results when the transmittance was 1% or greater.

TABLE 2

| | influence on environments (water-based/solvent-based) | bleeding out problem of UV absorber | adhesion between layers | clarity of background (L-value) | yellowing (b-value) | 350 nm UV transmittance | coefficient of kinetic friction | surface resistance (SR) |
|---|---|---|---|---|---|---|---|---|
| Example 4 (film sheet 4) | completely water-based | none | 100% | 91.8 | ○ | ○ | 0.20 | 10.42 |
| Example 5 | completely | none | 100% | 91.8 | ○ | ○ | 0.18 | 10.59 |

TABLE 2-continued

| | influence on environments (water-based/ solvent-based) | bleeding out problem of UV absorber | adhesion between layers | clarity of background (L-value) | yellowing (b-value) | 350 nm UV transmittance | coefficient of kinetic friction | surface resistance (SR) |
|---|---|---|---|---|---|---|---|---|
| (film sheet 5) | water-based | | | | | | | |
| Example 6 (film sheet 6) | completely water-based | none | 100% | 91.7 | ○ | ○ | 0.24 | 10.35 |
| Comparative Example 1 (film sheet 7) | solvent-based | somewhat found | 100% | 91.5 | ○ | ○ | 0.22 | 14.92 |
| Comparative Example 2 (film sheet 8) | completely water-based | none | 100% | 90.36 | X | X | 0.23 | 10.12 |
| Comparative Example 3 (film sheet 9) | completely water-based | none | 100% | 89.59 | X | ○ | 0.25 | 10.39 |
| Example 7 (film sheet 10) | completely water-based | none | 100% | 92.4 | ○ | ○ | 0.32 | 15.04 |
| Example 8 (film sheet 11) | completely water-based | none | 100% | 90.5 | X | ○ | 0.24 | 10.58 |
| Example 9 (film sheet 12) | completely water-based | none | 100% | 91.8 | ○ | ○ | 0.41 | 10.57 |

Absolutely no problem was found regarding camera unloadability for the film sheets 4 to 6. Further, no camera unloadability problems were found for film sheets 7 to 9 (Comparative Examples 1 to 3).

Example 7

A film sheet 10 was manufactured in the same way as described in Example 4, except that the coating liquid for the first undercoat layer was replaced with the following coating liquid.

| Composition of the coating liquid for the first undercoat layer | |
|---|---|
| Polyacrylic resin (JULYMER ET-410, manufactured by Nihon Pure Chemicals Co., Ltd., solid content: 30%) | 24 parts by mass |
| Epoxy-based hardener (EX614B, manufactured by Nagase Chemical Industries, Ltd., solid content: 100%) | 2.2 parts by mass |
| Nonionic surfactant (Compound 14) (solid content: 100%) | 0.8 parts by mass |
| Anionic surfactant (SANDET BL, manufactured by Sanyo Chemical Industries, Ltd., solid content: 44.6%) | 1.8 parts by mass |
| Distilled water | 971.2 parts by mass |

Example 8

A film sheet 11 was manufactured in the same way as described in Example 4, except that the coating liquid for the first undercoat layer was replaced with the following coating liquid.

| Composition of the coating liquid for the first undercoat layer | |
|---|---|
| Polyacrylic resin (JULYMER ET-410, manufactured by Nihon Pure Chemicals Co., Ltd., solid content: 30%) | 24 parts by mass |
| Spherical tin oxide particles (TDL-1, manufactured by Mitsubishi Materials Co., Ltd., solid content: 17%) | 110 parts by mass |
| Epoxy-based hardener (EX614B, manufactured by Nagase Chemical Industries, Ltd., solid content: 100%) | 2.2 parts by mass |
| Nonionic surfactant (Compound 14) (solid content: 100%) | 0.8 parts by mass |
| Anionic surfactant (SANDET BL, manufactured by Sanyo Chemical Industries, Ltd., solid content: 44.6%) | 1.8 parts by mass |
| Distilled water | 861.2 parts by mass |

Example 9

A film sheet 12 was manufactured in the same way as described in Example 4, except that the coating liquid for the second undercoat layer described in Example 4 was replaced with the following coating liquid.

| Composition of the coating liquid for the second undercoat layer | |
|---|---|
| Polyacrylic resin (JULYMER ET-410, manufactured by Nihon Pure Chemicals Co., Ltd., solid content: 30%) | 15 parts by mass |
| Colloidal silica particles (SNOWTEX C, manufactured by Nissan Chemical Industries, Ltd., solid content: 20%) | 11 parts by mass |
| Epoxy-based hardener (EX614B, manufactured by Nagase Chemical Industries, Ltd., solid content: 100%) | 1.3 parts by mass |
| Nonionic surfactant (Compound 16) (solid content: 100%) | 0.5 parts by mass |
| Anionic surfactant (SANDET BL, manufactured by Sanyo Chemical Industries, Ltd., solid content: 44.6%) | 1.0 parts by mass |
| Distilled water | 971.2 parts by mass |

The amounts of bleeding out of the ultraviolet absorbers, adhesion between layers, clarity of the background, coefficient of kinetic friction, and electric surface resistance (SR) of film sheets 10 to 12 manufactured in Examples 7 to 9 were measured. The methods for these assessments were in accordance with those described previously. The results are shown in Table 2.

No particular problems were found regarding the camera unloadability of the film sheets 10 to 12 (Examples 7 to 9).

In the present invention, since an ultraviolet light absorber having a reduced volatility (sublimability) is used, the volatilization of the ultraviolet light absorber from the film immediately after being extruded from the die section is reduced. Therefore, a reduction in ultraviolet light absorbency is prevented, or alternatively, the use of a large amount of the ultraviolet light absorber is not necessary. Moreover, problems such as the ultraviolet light absorber contaminating the production line can be avoided.

Use of the ultraviolet light absorber exhibiting the heat resistance defined in the present invention prevents yellowing and reduction of the ultraviolet light absorbancy of support film due to the decomposition of the ultraviolet light absorber. Decomposition of the polyester resin caused by the decomposition of the ultraviolet light absorber is also prevented.

The aforementioned results can be obtained at the same time by the use of the ultraviolet light absorber having both of the above-mentioned two characteristics.

Since the ultraviolet absorbent denoted by general formula (1) is both stable and has low volatility at high temperatures, it can produce the aforementioned results. Moreover, it is not necessary to use a solvent-based coating liquid to form the coating layers containing the ultraviolet absorbent, therefore the environmental impact is lessened. In addition, by kneading the ultraviolet absorbent into the support while making the support, it becomes unnecessary to pre-make the coating layer containing the ultraviolet absorbent, and the construction process is simplified.

What is claimed is:

1. A silver halide photographic photosensitive material in which a silver halide photosensitive layer is disposed on a transparent polyethylene terephthalate (PET) film into which an ultraviolet light absorber has been kneaded, wherein the ultraviolet light absorber is at least one kind of ultraviolet light absorber which exhibits a loss of mass of not greater than 10% when heated to 300° C. at a heating rate of 10° C./minute in a nitrogen gas atmosphere.

2. A silver halide photographic photosensitive material in which a silver halide photosensitive layer is disposed on a transparent polyethylene terephthalate (PET) film into which an ultraviolet light absorber has been kneaded, wherein the ultraviolet light absorber is at least one kind of ultraviolet light absorber for which a difference between a b-value of a sheet having a thickness of 1.5 mm formed after heating for 1 minute at 300° C., a PET resin including an amount of 0.4% by mass of the ultraviolet light absorber and having a water content of not greater than 50 ppm, and a b-value of a sheet having a thickness of 1.5 mm formed after heating the PET resin for 8 minutes at 300° C., is not greater than 3.0.

3. The silver halide photographic photosensitive material according to claim 2, wherein the ultraviolet light absorber exhibits a loss of mass of not greater than 10% when heated to 300° C. at a heating rate of 10° C./minute in a nitrogen gas atmosphere.

4. A silver halide photographic photosensitive material in which a silver halide photosensitive layer is disposed on a transparent polyethylene terephthalate (PET) film into which an ultraviolet light absorber has been kneaded, wherein the ultraviolet light absorber is at least one kind of ultraviolet absorber represented by the following general formula (1):

General Formula (1)

wherein $X^1$, $Y^1$, and $Z^1$ each independently represents an alkyl group, an aryl group, an alkoxy group, an aryloxy group, an alkylthio group, an arylthio group, or a heterocyclic group, which groups may each be substituted or unsubstituted, with the proviso that at least one of $X^1$, $Y^1$, and $Z^1$ represents a substituent represented by the following structural formula (A):

Structural formula (A)

wherein $R^1$ and $R^2$ each independently represents a hydrogen atom, a halogen atom, an alkyl group, an alkenyl group, an aryl group, an alkoxy group, an aryloxy group, an acyloxy group, an alkylthio group, an arylthio group, an amino group, an acyl group, an oxycarbonyl group, a carbamoyl group, a sulfamoyl group, a carboxyl group or a salt thereof, or a sulfo group or a salt thereof, which groups may each be substituted or unsubstituted, and adjacent $R^1$'s and $R^2$'s may join together to form a ring.

5. The silver halide photographic photosensitive material according to claim 4, wherein the molecular weight of the ultraviolet light absorber is not less than 400.

6. The silver halide photographic photosensitive material according to claim 1, wherein a coating layer including a water-dispersible resin and at least one of a surfactant, a matting agent, and a lubricating agent is disposed on a surface of a base support opposite to the surface on which the silver halide photosensitive layer is disposed.

7. The silver halide photographic photosensitive material according to claim 2, wherein a coating layer including a water-dispersible resin and at least one of a surfactant, a matting agent, and a lubricating agent is disposed on a surface of a base support opposite to the surface on which the silver halide photosensitive layer is disposed.

8. The silver halide photographic photosensitive material according to claim 6, wherein a coefficient of kinetic friction of a surface of the coating layer, which is disposed on the surface of the base support opposite to the surface on which the silver halide photosensitive layer is disposed, with respect to stainless steel, is not greater than 0.30.

9. The silver halide photographic photosensitive material according to claim 7, wherein a coefficient of kinetic friction of a surface of the coating layer, which is disposed on the surface or the base support opposite to the surface on which the silver halide photosensitive layer is disposed, with respect to stainless steel, is not greater than 0.30.

10. The silver halide photographic photosensitive material according to claim 1, wherein a coating layer including a water-dispersible resin and electroconductive tin oxide doped with antimony is disposed on a surface of a base support opposite to the surface on which the silver halide photosensitive layer is disposed, wherein the surface resistance (SR) of the coating layer is from $10^6$ to $10^{12}$ Ω·cm.

11. The silver halide photographic photosensitive material according to claim 2, wherein a coating layer including a water-dispersible resin and electroconductive tin oxide doped with antimony is disposed on a surface of a base support opposite to the surface on which the silver halide photosensitive layer is disposed, wherein the surface resistance (SR) of the coating layer is from $10^6$ to $10^{12}$ Ω·cm.

12. The silver halide photographic photosensitive material according to claim 10, wherein the electroconductive tin oxide has an acicular structure in which a ratio of major axis to minor axis is from 3 to 50.

13. The silver halide photographic photosensitive material according to claim 11, wherein the electroconductive tin oxide has an acicular structure in which a ratio of major axis to minor axis is from 3 to 50.

14. The silver halide photographic photosensitive material according to claim 1, wherein a coating layer having a surface resistance (SR) of from $10^6$ to $10^{12}$ Ω·cm and a coating layer having a coefficient of kinetic friction with respect to stainless steel of not greater than 0.30 are formed, in this order, on a surface of a base support opposite to the surface on which the silver halide photosensitive layer is disposed.

15. The silver halide photographic photosensitive material according to claim 2, wherein a coating layer having a surface resistance (SR) of from $10^6$ to $10^{12}$ Ω·cm and a coating layer having a coefficient of kinetic friction with respect to stainless steel of not greater than 0.30 are formed, in this order, on a surface of a base support opposite to the surface on which the silver halide photosensitive layer is disposed.

16. The silver halide photographic photosensitive material according to claim 14, wherein the coating layer having a surface resistance (SR) of from $10^6$ to $10^{12}$ Ω·cm includes a water-dispersible resin and electroconductive tin oxide doped with antimony, and the coating layer having a coefficient of kinetic friction with respect to stainless steel of not greater than 0.30 includes a water-dispersible resin and a lubricating agent.

17. The silver halide photographic photosensitive material according to claim 15, wherein the coating layer having a surface resistance (SR) from $10^6$ to $10^{12}$ Ω·cm includes a water-dispersible resin and electroconductive tin oxide doped with antimony, and the coating layer having a coefficient of kinetic friction with respect to stainless steel of not greater than 0.30 includes a water-dispersible resin and a lubricating agent.

18. The silver halide photographic photosensitive material according to claim 1, wherein the silver halide photosensitive material layer is a diffusion transfer photographic photosensitive material layer.

19. The silver halide photographic photosensitive material according to claim 2, wherein the silver halide photosensitive material layer is a diffusion transfer photographic photosensitive material layer.

* * * * *